US005802582A

United States Patent [19]
Ekanadham et al.

[11] Patent Number: 5,802,582
[45] Date of Patent: Sep. 1, 1998

[54] EXPLICIT COHERENCE USING SPLIT-PHASE CONTROLS

[75] Inventors: Kattamuri Ekanadham, Mohegan Lake; Beng-Hong Lim, White Plains; Pratap Chandra Pattnaik, Ossining, all of N.Y.

[73] Assignee: International Business Machines Corporation, Armonk, N.Y.

[21] Appl. No.: 711,750

[22] Filed: Sep. 10, 1996

[51] Int. Cl.⁶ .................................................. G06F 12/14
[52] U.S. Cl. ........................ 711/152; 711/141; 711/169; 395/726
[58] Field of Search .......................... 395/726; 711/142, 711/143, 144, 145, 152, 157, 173, 141, 169, 148, 5

[56] References Cited

U.S. PATENT DOCUMENTS

| | | | |
|---|---|---|---|
| 5,301,290 | 4/1994 | Tetzlaff et al. | 711/142 |
| 5,551,046 | 8/1996 | Mohan et al. | 707/8 |

OTHER PUBLICATIONS

R. S. Nikhil Cid: A parallel, "Shared-Memory" C for Distributed-memory Machines, Digital Equipment Corporation, Cambridge Research Laboratory, Sep. 29, 1994, p. 114.

K. L. Johnson, M. F. Kasshoek, and D. A. Wallach, CRL: High-Performance All-Software Distributed Shared Memory, MIT Laboratory for Computer Science, Cambridge, MA 02139, Dec. 1995, pp. 1–16.

H. E. Bal, M. F. Kaashoek, A. S. Tanenbaum, Orca: A Language for Parallel Programming of Distributed Systems, IEEE Transactions on Software Engineering, vol. 18, No. 3, Mar. 1992, pp. 190–205.

B. N. Bershad, M. J. Zekausakas, and W. A. Sawdon, The Midway Distributed Shared Memory System, School of Computer Science, Carnegie Mellon University, Pittsburg, PA 15213, COMPCON 1993.

M. D. Hill, Jr., J. R. Larus, S. K. Reinhardt, and D. A. Wood, Cooperative Shared Memory: Software and Hardware for Scalable Multiprocessors, University of Wisconsin-Madison, Nov. 1, 1993, ACM Transactions on Computer Systems, pp. 1–20.

H. S. Sandhu, B. Gamsa, and S. Shou, The Shared Regions Approach to Software Cache Coherence on Multiprocessors, Computer Systems Research Institue, U. of Toronto, May 1993, pp. 229–238.

D. J. Scales and M. S. Lam, The Design and Evaluation of a Shared Object System for Distributaed Memory Machines, Computer Systems Laborator, Stanford U., CA 94305, First Symposium on Operating Systems Design and Implementation, Nov., 1994, pp. 1–14.

K. Gharachorloo, D. Lenoski, J. Laudon, P. Gibbons, A. Gupta, and J. Hennessy, Memory Consistency and Event Ordering in Scalable Shared-Memory Multiprocessors, Computer System Laboratory, Stanford U., CA 94305, IEEE 1990, pp. 15–24.

D. Leonosk, J. Laudon, T. Joe, D. Nakahira, L. Stevens, A. Gupta and J. Hennessy, Computer Systems Laborator, Stanford U., CA 94305, 1992 ACM, pp. 92–103.

D. Chaiken, J. Kubiatowicz, and A. Agarwal, LimitLESS Directories: A Scalable Cache Coherence Scheme, Laboratory for Computer Science, MIT, Cambridge, MA 02139, ASPLOS–IV, Apr., 1991, p. 11.

R. Chandra, K. Gharachorloo, V. Soundararajan, and A. Gupta, Performance Evaluation of Hybrid Hardware and Software Distributed Shared Memory Protocols, Computer System Laboratory, Stanford U., CA 94305, Dec. 1993, pp. 1–15.

*Primary Examiner*—Eddie P. Chan
*Assistant Examiner*—Hiep T. Nguyen
*Attorney, Agent, or Firm*—Douglas W. Cameron

[57] ABSTRACT

A method and apparatus for maintaining cache coherence in a shared memory multiprocessor system, where cache coherence is preserved between lock acquires and releases rather than at every single memory load and store. With this invention, a Global Lock Manager (GLM) keeps track of the status of locked ranges without the need to maintain a list of individual processors in the system. Further a Recently Acquired Lock Manager (RALM) keeps track of the status of locked ranges within a processing node to reduce the need to communicate with a GLM.

5 Claims, 8 Drawing Sheets

FIG. 3

RALT

| RANGE | MODE | VERSION | REFERENCE COUNT | IN-USE | RELINQUISH |
|---|---|---|---|---|---|
| MEMORY ADDRESS RANGE X to Y e.g. 1000-2000 | READ-ONLY /WRITE | n' | k' | Y/N | Y/N |
| | | | | | |

GLT

| RANGE | MODE | VERSION | REFERENCE COUNT | OWNER |
|---|---|---|---|---|
| MEMORY ADDRESS RANGE X to Y | READ-ONLY /WRITE | n | k | PROCESSING NODE P |
| | | | | | ic
EXPLICIT COHERENCE USING SPLIT-PHASE CONTROLS

DESCRIPTION

1. Technical Field

This invention relates to improving cache coherence in a shared memory multiprocessor system. More specifically, with this invention coherence is preserved only between lock acquires and releases.

2. Description of the Prior Art

A multiprocessing system comprised of a plurality of processing nodes with private data caches introduces the problem of cache coherence, whereby private copies of data in those caches may become outdated. In prior solutions, hardware support preserves the coherence of the caches by automatically invalidating or updating all caches whenever the data is written, and retrieving the latest copy of data whenever the data is read.

A major problem with such prior solutions is the complexity of hardware necessary to maintain cache coherence automatically at each data read or write. Prior solutions either broadcast reads and writes to all caches or maintain a directory of all the caches that have copies of the data. Broadcasting reads and writes requires a high-speed memory bus, and limits the size of the multiprocessing system. Maintaining directories results in excessive hardware, and the memory required for directories rapidly becomes a significant fraction of system cost as the size of the system increases. In all prior solutions, the cache and memory subsystems have to be substantially modified and cannot rely on off-the-shelf parts.

SUMMARY OF THE INVENTION

It is therefore an objective of this invention to provide a simple, yet efficient solution to the problem of cache coherence, both in terms of performance and hardware complexity.

This invention takes a new approach to cache coherence, and requires minimal hardware support, as compared to prior approaches. It does not rely on broadcasts or directories. The cache and memory subsystem can be built from off-the-shelf parts, and do not need to to participate actively in maintaining coherence. This invention provides a simple and efficient implementation of cache coherence that avoids much of the complexity in prior solutions. That is, there is no need for the cache and memory system to broadcast reads and writes or maintain a directory of the status of the caches in the system. It is also highly parallel and scalable.

Instead of automatically preserving cache coherence for the entire memory at each memory read or write, our invention preserves coherence of only a specified range of memory addresses and only during the period between lock acquires and releases associated with that range. It relies on the property that parallel programs synchronize accesses to shared data using locks. When a program reads shared data, it first acquires a lock in read mode. When the program is done reading the shared data, it releases the lock in read mode. When a program writes shared data, it first acquires a lock in write mode. When the program is done writing the shared data, it releases the lock in write mode. With this property of parallel programs, the invention guarantees that shared data that is read and written is always coherent.

As such, the invention comprises a Coherence Object Controller (COC) that maintains the coherence of address ranges at lock acquires and releases. An address range is any contiguous sequence of memory locations within a process' virtual address space. The COC comprises a Global Lock Manager (GLM), Recently Acquired Lock Manager (RALM), and a Completion Bit Vector (CBV).

The GLM includes a Global Lock Table (GLT) that keeps track of all locks that are currently in effect for all processors. Requests for lock/unlock operations are directed to the GLM. Unlike prior solutions that require directories, the GLT entries do not contain a directory of processors holding the locks. Instead they contain a simple reference count for the number of locks issued.

In order to minimize the need to communicate with the GLM, the COC on each processing node includes an RALM, which includes a Recently Acquired Lock Table (RALT) that keeps track of the locks acquired by the processor in the same processing node.

In order to minimize the impact of communications synchronization latency, the lock acquire and release operations are split-phase, i.e., the submission and subsequent completion of the lock operations are split into two distinct operations. A processor may submit a lock operation and detect the completion of the operation at a later time by consulting a Completion Bit Vector.

This method of maintaining cache coherence is referred to as "explicit coherence" because the program explicitly locks and unlocks memory address ranges that are to be read or written. There is no automatic coherence as in prior cache systems, where a cache forcefully invalidates or updates other caches whenever shared data is written. In explicit coherence, a processor waits until all other processors have voluntarily released their locks on the shared data by issuing an explicit release command before a write can proceed. A chief consequence of this is that there is no need for forced invalidation, and no need to broadcast or maintain a directory for notifying caches of forced invalidations or updates.

The requisite hardware support is minimal compared with prior approaches. The hardware provides locks on memory ranges while the software provides locks on shared objects. By mapping shared objects to memory ranges in hardware, the hardware provides greater support for the programming model. By bridging and connecting the hardware to the programming model, this invention provides a simple and efficient implementation of cache coherence that avoids much of the complexity in modern memory subsystems. That is, with this invention, hardware complexity is reduced because coherence is maintained on a range rather than a line bases. This latter feature eliminates the need to maintain the status of individual memory lines in the caches. This latter feature also allows for a less aggressive hardware implementation on account of the reduced frequency of coherence activities.

Accordingly, this invention is a coherence object controller for operation within a multiprocessor system. The controller is designed to prevent corruption of the objects caused by concurrent access to the objects by the processors. With this invention, each of the processors can submit an explicit coherence command to its coherence object controller. When the coherence object controller receives the explicit coherence command from its processor, the coherence object controller causes its processor to hold a range of addresses upon completion of the acquire explicit coherence command. That is, the coherence command is completed when the GLM responds with "granted". See below. If the acquire explicit coherence command is an acquire write command then the range will be held in the write mode. Otherwise, if the acquire explicit coherence command is an acquire read only command, then the range is held in the read-only mode. When the coherence object controller receives a release explicit coherence command from its processor, the coherence object controller causes its processor to drop a range of addresses upon completion of the release explicit coherence command.

BRIEF DESCRIPTION OF THE DRAWINGS

FIG. 3 schematically illustrates the Recently Acquired Lock Table (RALT) and the Global Lock Table (GLT).

DESCRIPTION OF THE PREFERRED EMBODIMENT

Figure 1:
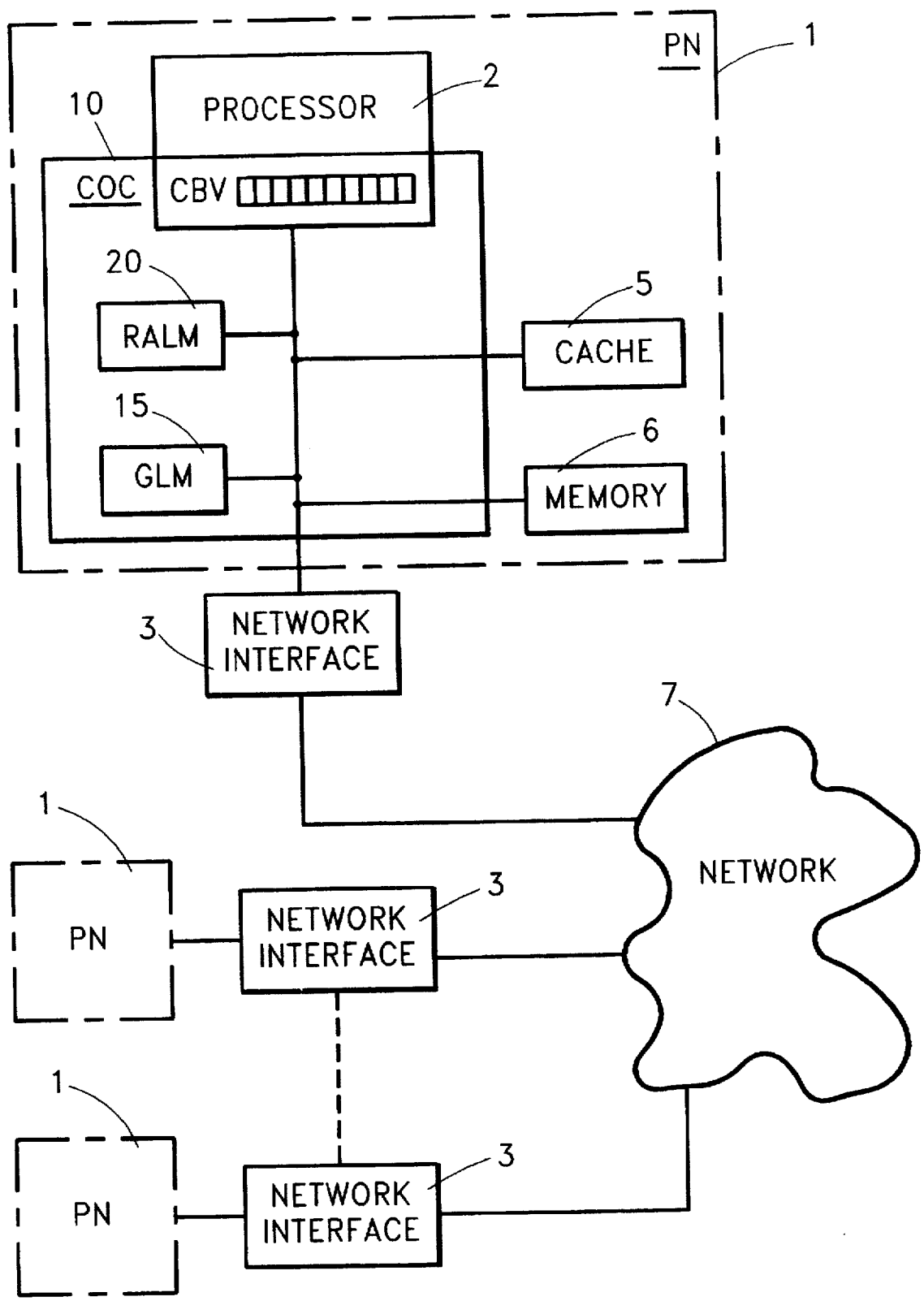
FIG. 1 schematically illustrates the multiprocessor system in which the coherence object controller of this invention is implemented.

FIG. 1 illustrates the structure of the environment for embedding our invention. The environment comprises a plurality of digital data processing nodes 1 connected via a generic communication network interface 3 and communication network 7. In the following description "local" refers to components within the same processing node, and "remote" refers to components within a different processing node.

Figure 2:
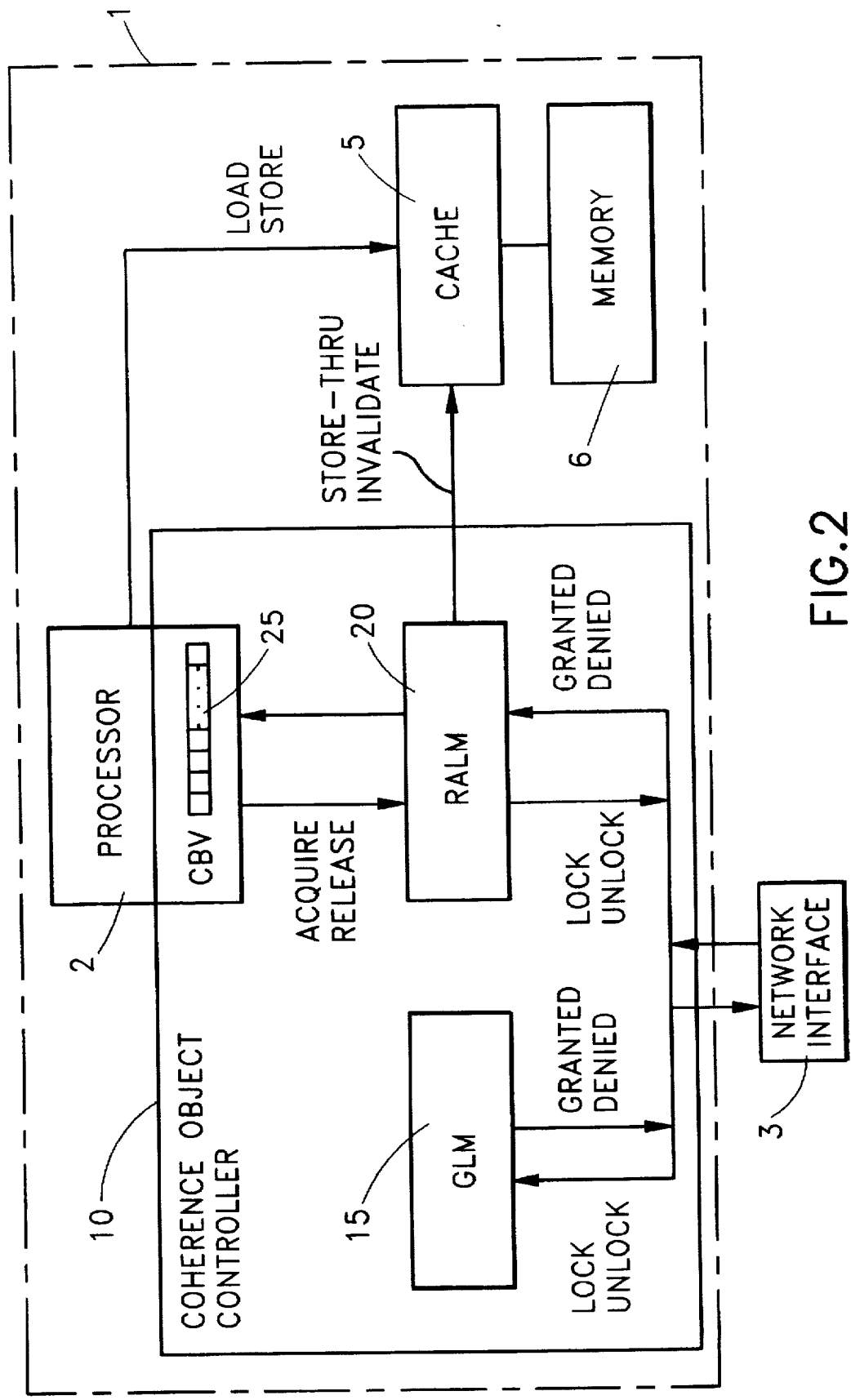
FIG. 2 schematically illustrates a processing node, and more particularly, the coherence object controller within the processing node. Also shown is the completion bit vector.

FIG. 2 provides an expanded view of the structure of each processing node. Within each processing node is a processor 2 and a cache and memory subsystem 5. Also shown are a Global Lock Manager (GLM) 15, a Recently Acquired Lock Manager (RALM) 20, and a Completion Bit Vector (CBV) 25 embedded within each processing node 1. The RALM receives lock acquire and release commands from the processor and communicates with (possibly remote) GLMs in order to satisfy these commands. The RALM also issues cache invalidation commands to the cache subsystem 5.

3.1 Processor Interface

The above commands are defined, which will serve as primitives for a processor to acquire and release locks on memory ranges:

Acquire (range, mode, completion-bit) Range is a virtual address range as defined above. Mode is a bit indicating whether the range is being acquired in read-only or write mode. Completion-bit is a bit that is initially set to 0, and subsequently set to 1 when the acquire completes successfully. At this point, when the completion bit is set to 1, if the mode of the acquire command is write, then the processor holds the corresponding range in the write mode. However, if the mode of the acquire command is read only, then the processor would hold the corresponding range in the read only mode. The acquire command is split-phase. The processor submits a request to the COC and continues execution of its program while the acquire is in progress. After the specified completion bit gets set to 1, the processor can safely access and cache memory locations within the range, and the COC will maintain coherence for the locally cached copies of the memory range.

Release (range) The range must have been acquired earlier using the Acquire command described above. The processor submits a request to the COC continues execution of its program. Immediately after submission of the request, the processor drops the range. When the range is dropped, subsequent accesses to the range are no longer coherent. The COC releases the range and is no longer responsible for maintaining coherence for the locally cached copy of the memory range until a subsequent Acquire for the range is issued.

3.2 Global Lock Manager (GLM)

The Global Lock Manager (GLM) has a Finite State Machine (FSM) and a Global Lock Table (GLT). The operation of the FSM is described and illustrated in FIGS. 8–9. One way of implementing the FSM is by using Programmable Logic Arrays (PLA) which are well known in the art.

Referring to FIG. 3, GLM 15 comprises a table (GLT) that keeps track of ranges that are currently acquired by the processors in the multiprocessing system. The entire virtual memory address space is partitioned among the processing nodes, and a particular address range is always handled by the same GLM on a particular node. FIG. 3 illustrates the data structure of the GLT. Each entry of the GLT comprises a tuple T1=(range, mode (RO/W), version n, reference-count k, and owner p ). "Range" x to y designates a memory address range associated with a lock acquire or release command. "Mode" designates whether said range is locked in read-only (RO) mode or write (W) mode. "Version" designates the number of times a lock for said range has been acquired in the write mode. "Reference-count" designates the number of processors that are currently holding locks for said range. "Owner" designates the single processor that currently holds the range in a write mode if such range is held in the write mode.

The GLM supports two operations:

lock (range, mode, completion-bit, n) This operation acquires the specified range in the specified mode on behalf of processing node n. If successful, the GLM responds to node n with granted (range, mode, completion-bit, version). Otherwise, it responds with denied (range, mode, completion-bit).

unlock (range) This operation unlocks the specified range, making it eligible for subsequent locking.

3.3 Recently Acquired Lock Manager (RALM)

The Recently Acquired Lock Manager (RALM) has a RALT and FSM, the operation of which is illustrated in FIGS. 4 through 7 and described below. As with the FSM for the GLM, the FSM for the RALM can be implemented using PLA's.

Again referring FIG. 3, RALT 20 comprises a table that keeps track of ranges that are currently acquired by the local processor. Its purpose is to avoid unnecessary cache flushes and to minimize communication with possibly remote GLMs. Each entry of the RALT comprises a tuple T2=(range x to y, mode (R0/W), version n', reference-count k', in-use, relinquish). "Range" designates a memory address range associated with a lock acquire or release command. "Mode" designates whether the range is locked in read-only mode or write mode. "Version" designates the version number of the data in said memory address range that is replicated in the local cache. "Reference-count" designates the number of cache lines in said range that is replicated in the local cache. "Relinquish" designates that the RALM should relinquish ownership of the range upon a lock release. "In-use" designates whether the entry is currently in use and is used for reclaiming entries in the RALT that are no longer needed "currently-in-use" means that the information in corresponding entry is still available for use by the RALM. The reclaimed entries in the RALT can then be use for different ranges.

The RALM sends lock and unlock operations to the appropriate GLM on behalf of the local processor's commands to acquire and release memory ranges (Acquire and Release), and receives the following responses:

granted (range, mode, completion-bit, version) This operation indicates that a lock is acquired. This updates the RALT and sets the corresponding completion-bit.

denied (range, mode, completion-bit) This operation retries the locking operation for the specified range.

The RALM also generates store-thru and invalidate operations to the local cache.

3.4 GLM and RALM Algorithms

FIG. 4 through FIG. 9 provide flowcharts of the algorithm followed by the finite state machines in the GLM and RALM in response to the commands described above. In the algorithms, two ranges match if they share any common memory addresses. Refer to FIG. 2 for the command flow between the components of the system.

Figure 4:
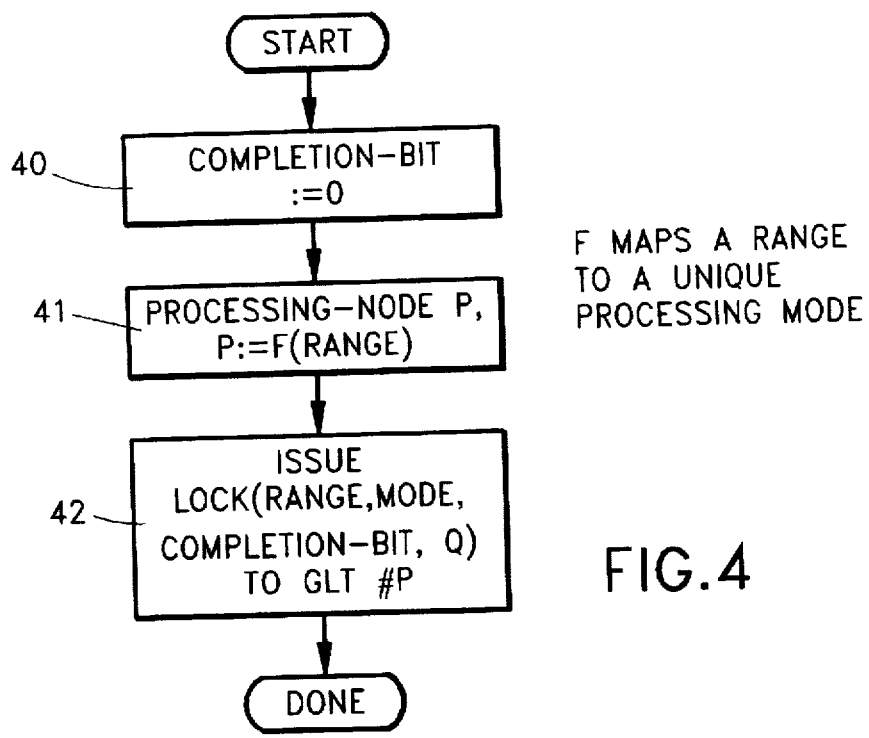
FIG. 4 schematically illustrates the flowchart for the acquire command.

Acquire (range, mode, completion-bit) See FIG. 4.

1. Reset (40) the specified completion-bit in the CBV.
2. Compute (41) the processing node that handles the range.
3. Issue (42) lock (range, mode, completion-bit, Q) to that processing node which handles the range, where Q is the local processing node issuing the lock request.

Figure 5:
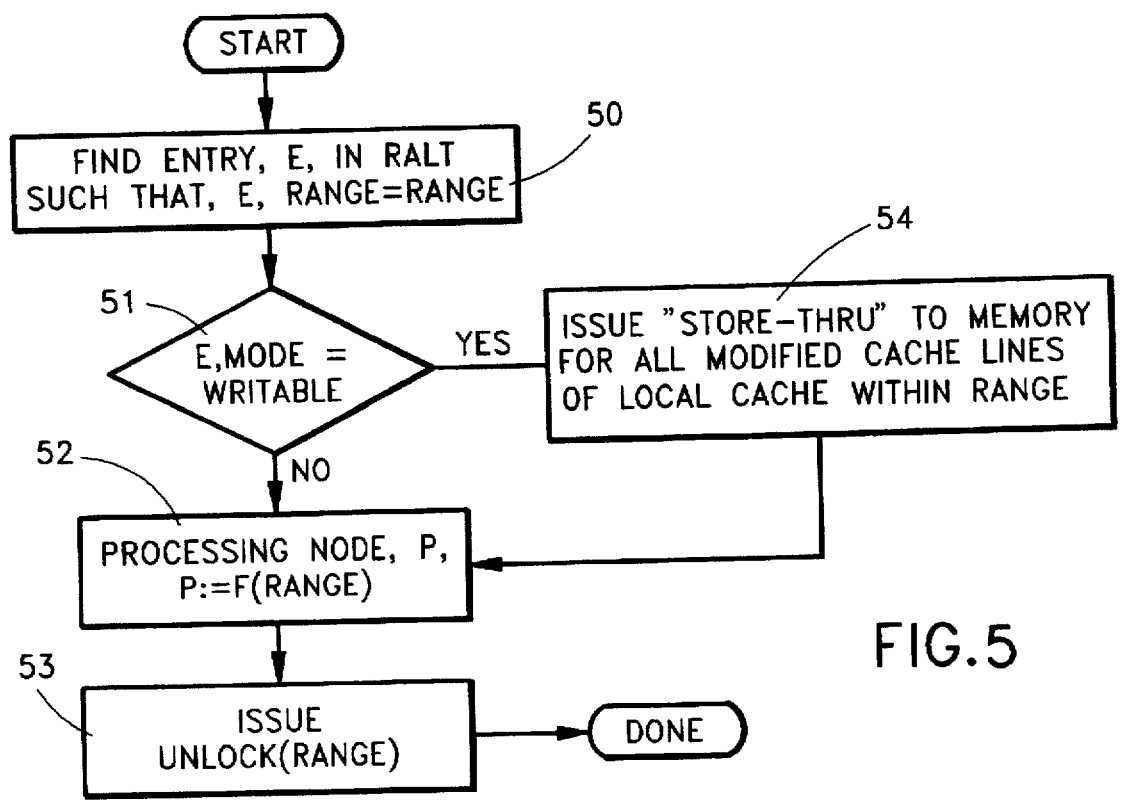
FIG. 5 schematically illustrates the flowchart for the release command.

Release (range) See FIG. 5.

1. Find (50) the entry, E, in RALT that matches the range.
2. If E.mode=writable (51), issue (54) store-thru for all lines from this range that are modified in the cache and wait for store acknowledgements for them from the cache.
3. Compute (52) the processing node that handles the range.
4. Issue (53) unlock (range) to that processing node, which handles the range.

Figure 8:
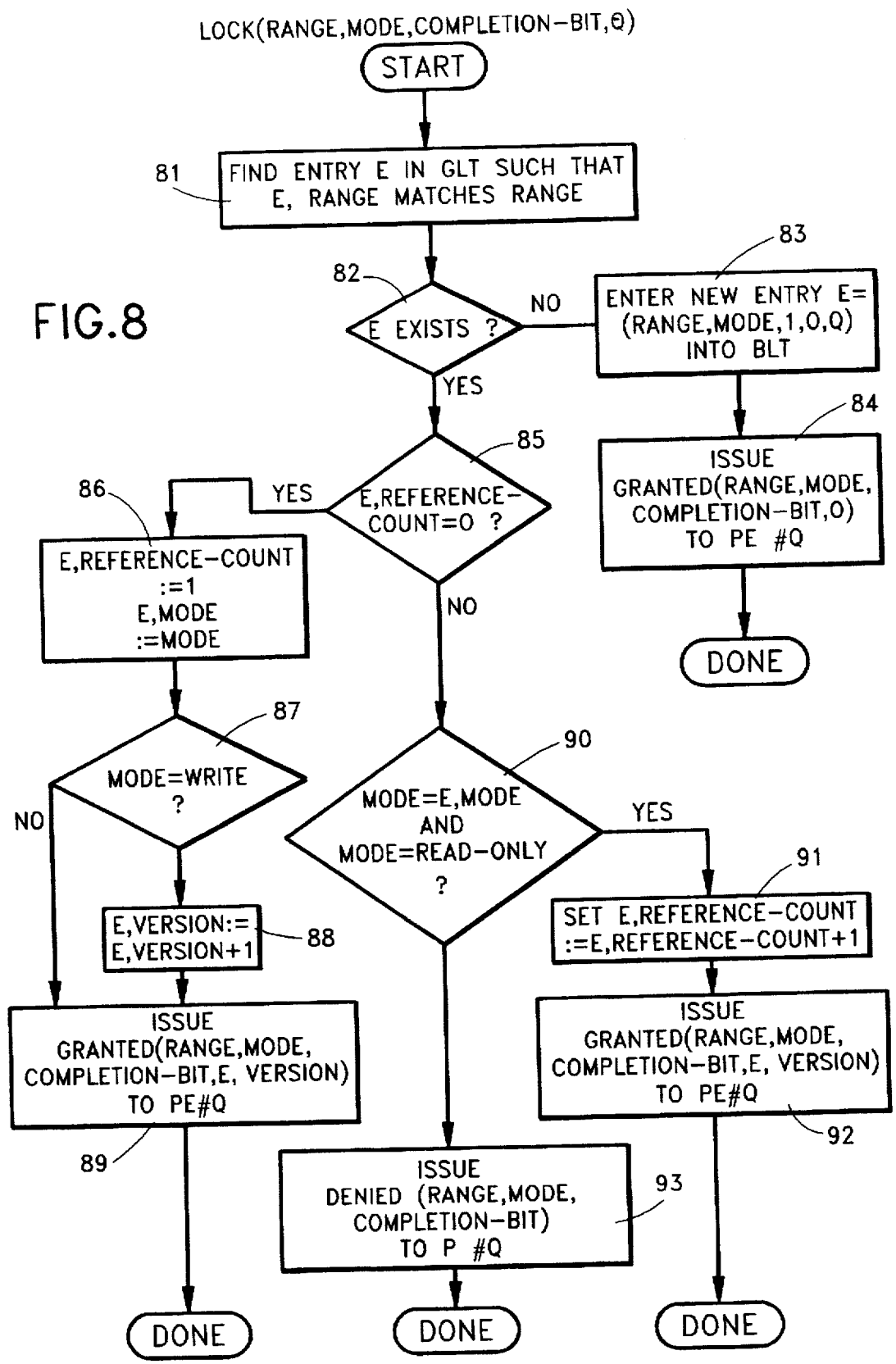
FIG. 8 schematically illustrates the flowchart for actions taken by the Global Lock Manager (GLM) upon receiving a lock command from the RALM.

Lock GLT (range, mode, completion-bit, Q) See FIG.8.

1. Search (81) GLT for an entry, E, matching the range.
2. If no match (82), then
   (a) Enter (83) into GLT the new entry [range, mode, 1, 0, Q] See GLT of FIG. 3 for entry format.
   (b) Issue (84) granted (range, mode, completion-bit, 0) to processing node Q.
3. Else if E.reference count=0, then:
   (a) Set E.reference count:=1
   (b) Set E.mode:=mode. See 86 for (a) and (b).
   (c) If (mode=write), set E.version:=E.version+1 (88).
   (d) Issue granted (range, mode, completion-bit, E.version) to processing node Q (89).
4. Else (90) if (mode=E.mode=read-only), then
   (a) Set E.reference count:=E.reference count+1 (91).
   (b) Issue granted (92) (range, mode, completion-bit, E.version) to processing node Q.
5. Else issue (90) denied (range, mode, completion-bit) to processing node Q. (See 93).

Figure 9:
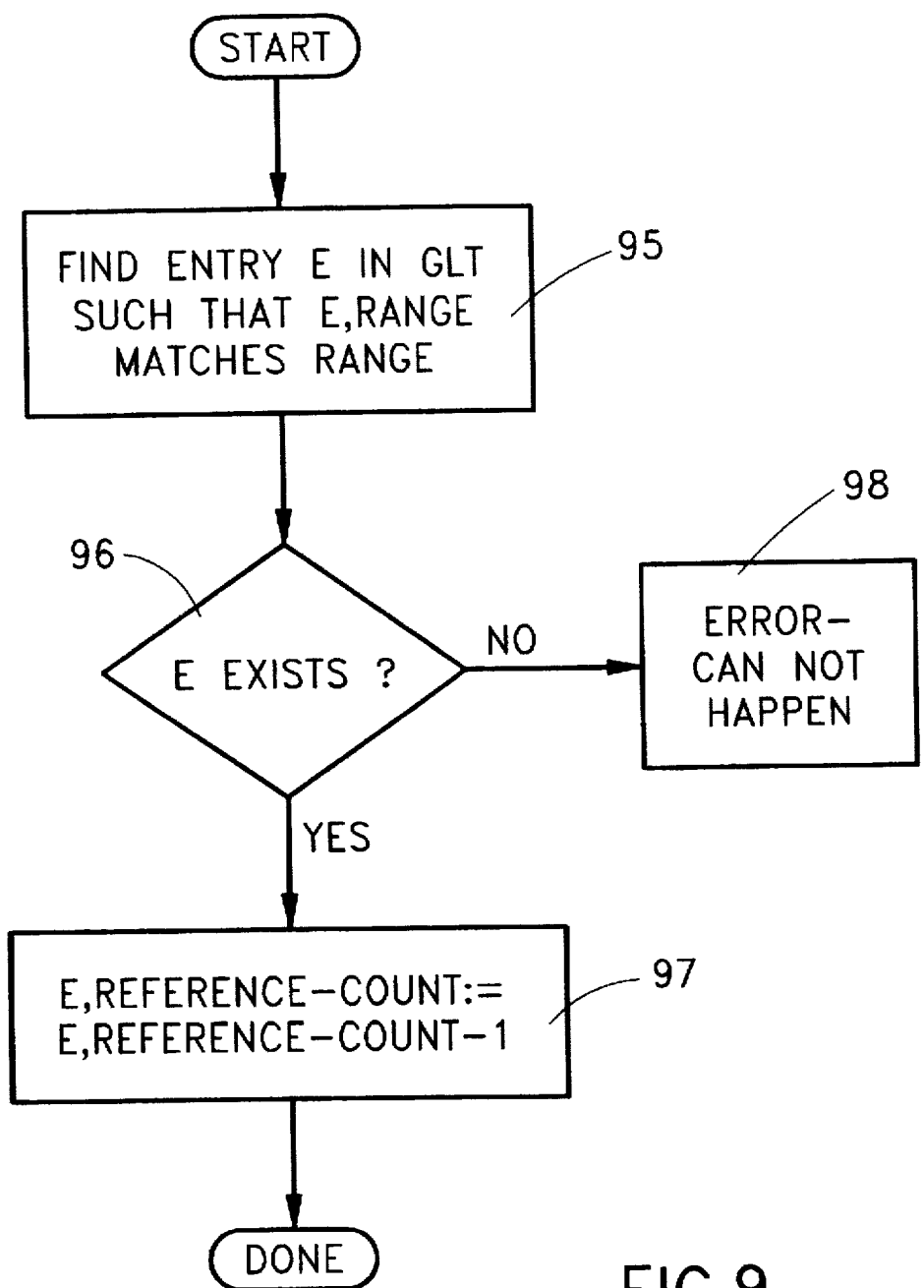
FIG. 9 schematically illustrates the flowchart for actions taken by the Global Lock Manager (GLM) upon receiving an unlock command from the RALM.

Unlock (range) See FIG. 9.

1. Search (95) GLT for an entry, E, that matches the specified range
2. Set E.reference count:=E.reference count−1 See 97.

Figure 6:
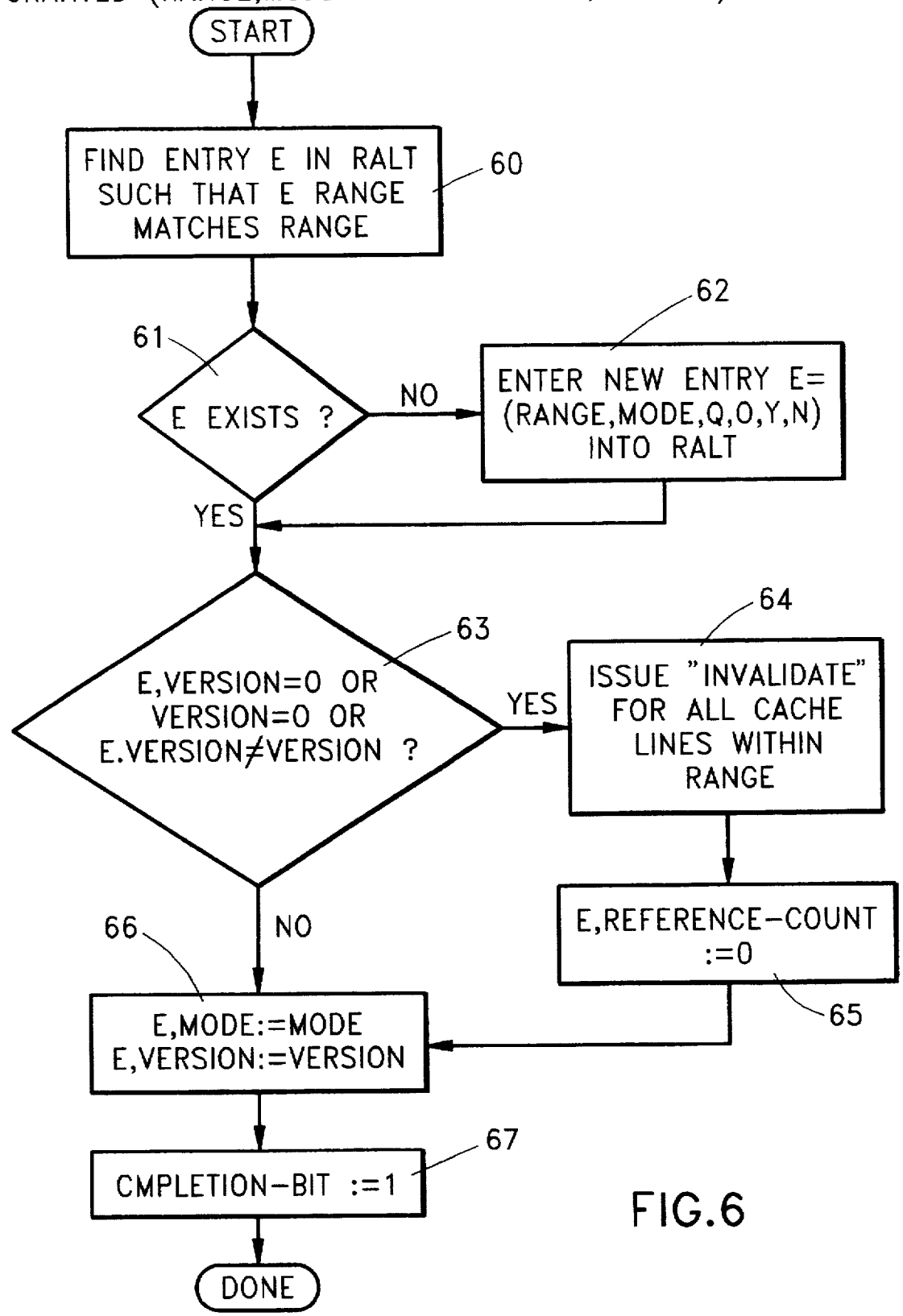
FIG. 6 schematically illustrates the flowchart of actions taken by the Recently Acquired Lock Manager (RALM) upon receiving a granted response from the Global Lock Manager (GLM).
Figure 7:
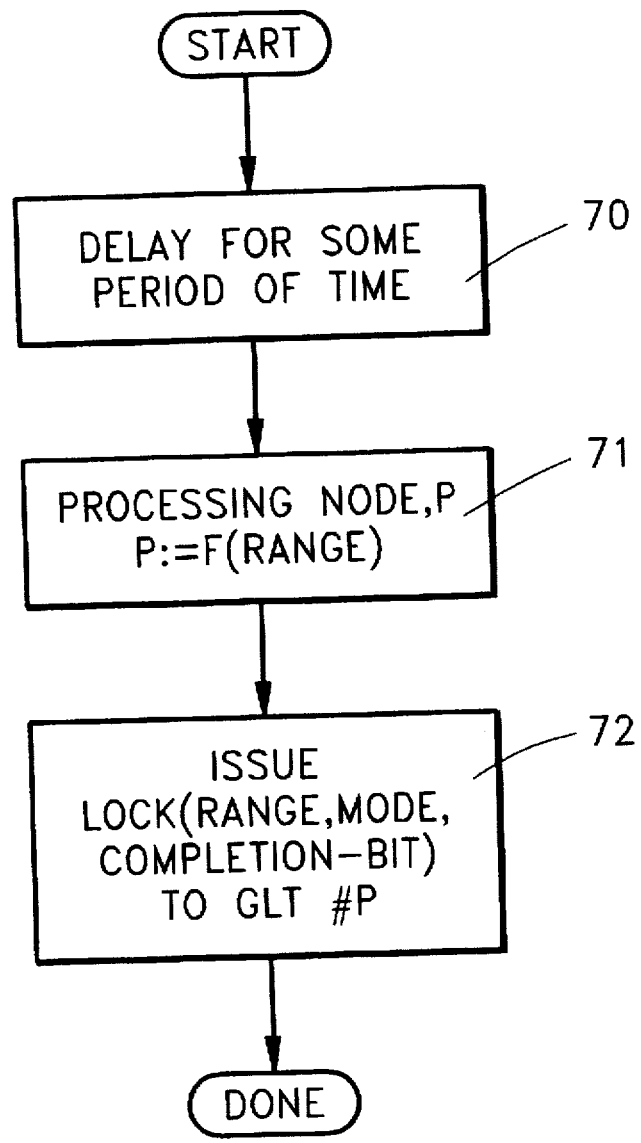
FIG. 7 schematically illustrates the flowchart of actions taken by the Recently Acquired Lock Manager (RALM) upon receiving a denied response from the Global Lock Manager (GLM).

Granted (range, mode, completion-bit, version) See FIG. 6.

1. Search (60) RALT for an entry, E, that matches the specified range
2. If (61) no match, then:
   (a) Enter (62) into RALT the new entry E=[range, mode, 0, 0, Y, N]
   (b) Use this entry E in the following steps.
3. If (63) (version=0) or (E.version=0) or (version 6=E.version), then:
   (a) Invalidate (64) all lines in the cache that belong to this range by issuing the invalidate operation to the cache.
   (b) Set (65) E.reference count:=0
4. Set E.mode:=mode
5. Set E.version:=version See 66 for 4–5.
6. Set the specified completion-bit Denied (range, mode, completion-bit) See FIG. 7.

1. Delay (70) for some period of time.
2. Compute (71) the processing node that handles the range.
3. Issue (72) lock (range, mode, completion-bit) to that processing node.

3.5 Cache Operation See FIG. 2.

The cache 5 performs normal operations. When a line is present in cache, it returns the line in response to a load/store (read/write) command from the processor. Otherwise, a request is made to memory, and a new line in the cache is filled with the memory 6 contents. Lines are marked dirty when modified. Lines can be purged on a Least Recently Used (LRU) basis as usual. When a dirty line is purged, it is written into the memory. When a store-thru request is received from the RALM, the line is written into the memory, its dirty bit is reset, but the line is retained in cache in exclusive mode. When an invalidate request is received from the RALM, the line is simply marked as invalid.

4 Extensions for Optimizing Performance

4.1 Virtualizing the Completion Bit Vector

In the design described above, the completion bit vector may be accessed by any user process. Some protection mechanism must be provided to allow multiprogramming. Three possible designs to allow protected user-level access to the completion bit vector are outlined below.

Base-Bounds Checking

In this scheme, the operating system allocates contiguous ranges of the completion bit vector to user processes, say at initialization time; and by using a base and bounds register, the hardware prevents a user process from addressing any completion bits outside of that range. The base and bounds register is part of a process state and needs to be saved and restored during process switches.

User processes specify completion bits using an index, and the hardware adds the base to the index and faults if the resulting completion bit is not within the allowable range.

All communication between nodes uses the absolute index of the completion bit. Hence, this scheme allows a response to an Acquire operation to set the completion bit, although the originating process may have been descheduled.

Pending-Response Counter

In this scheme, the operating system delays switching processes until all pending responses return. The RALM implements a counter that records the number of outstanding responses, and the operating system waits for the counter to go to zero before switching to new process. This scheme is possible because there are no unbounded delays for responses to an Acquire operation. The GLM either returns success or failure within a finite period of time. Thus, the operating system will not have to wait infinitely long before completing a process switch.

During a process switch, the operating system saves the current contents of the completion bit vector into a process save area and restores the bit vector of the newly scheduled process.

Pinned Memory

In this scheme, the completion bit vector is mapped into the user's address space, effectively implementing the bit vector in system memory 6. In this way, processes are constrained by virtual memory hardware to access only its own completion bits. This scheme also requires some operating system support to handle outstanding Acquire operations during a process switch, as in the Pending-Response Counter solution described above.

The completion bits are mapped into a pinned memory area that the operating system sets aside for each process. In AIX, for example, there is a pinned page of memory for the process' u-block area. All communication between nodes use the physical address to specify the completion bit, and the RALM can write the completion bit directly into DRAM.

To accelerate access to the completion bit vector, it is also possible to mirror the bit vector in a fast on-chip register. When a response arrives to set a bit in the bit vector, the RALM sets it in DRAM as usual. In addition, if the bit belongs to the currently running process, the on-chip register is also set. During a process switch, the on-chip register is loaded from the copy in DRAM.

4.2 Caching of Exclusive-Mode Locks

The RALM always has to contact the (possibly remote) GLM in order to acquire/release a lock, although the data in range associated with the lock can be cached locally. This is done to avoid the need for directories for recording cached copies for the lock. However, this is wasteful in the case where a single processor repeatedly accesses the same lock without any intervening accesses from another processor.

We propose an optimization to avoid contacting the GLM in the case of exclusive-mode locks. In this optimization, if a lock is acquired in exclusive mode, the RALM is allowed to cache the lock. The GLM only needs to remember the single node that has the lock cached. A Release operation retains a copy of the lock in the RALM, and repeated accesses by a single processor are serviced directly by the RALM. If another processor issues an acquire for the lock (in either shared or exclusive mode), the GLM sends a relinquish request to the RALM that has the lock cached. During the next Release operation, the RALM relinquishes the copy of the lock. The necessary hardware support for implementing this optimization is a field in GLT entries to record the owner of an exclusive mode lock, and a relinquish bit in RALT entries to determine whether to drop the cached lock upon a Release operation. It is important to note that we still do not require a directory unlike previous approaches.

Having thus described our invention, what we claim as new and desire to secure by Letters Patents is:

1. A coherence object controller for operation with a multiprocessor system for interleaving accesses to a plurality of objects while preventing corruption of said objects, said coherence object controller comprising:

a. a Recently Acquired Lock Manager (RALM) for receiving explicit coherence commands from one of said processors, wherein said command to acquire a range of memory addresses is submitted by one of said processors, wherein each of said explicit coherent commands can be either an acquire command or a release command, said acquire command being a command to acquire a range of memory addresses in a write or read only mode, said release command being a command to release a range of memory addresses, and said recently acquired lock manager for generating lock commands in response to said explicit coherence commands, said RALM receiving responses to said lock commands and setting completion bits in a completion bit vector maintained in said one processor, each completion bit in said completion bit vector indicating completion of a corresponding one of said explicit coherence commands; and b. a Global Lock Manager (GLM) for receiving said lock commands from said RALM and for generating said responses granting or denying said lock commands from said RALM, wherein each of said lock commands indicates either a write or a read only mode, wherein said RALM and GALM prevent multi-processors from simultaneously modifying said objects by granting said lock commands in a write mode to only a single processor at a time, wherein said command to acquire a range of memory addresses is submitted by one of said processors, wherein said one processor is permitted to continue execution of other commands after submission of said acquire command and without waiting for completion of said acquire command, and wherein said one processor checks for the setting of a corresponding bit in said completion bit vector before it accesses said range specified in said acquire command.

2. The controller as recited in claim 1, wherein a reference count is used to indicate release of said first range by all other of said processors.

3. The controller as recited in claim 1, wherein each processor issuing an explicit coherence write command with a first range of addresses waits for release of said first range by all other of said processors before writing to said first range.

4. A coherence object controller for operation with a multiprocessor system for interleaving accesses to a plurality of objects while preventing corruption of said objects, said coherence object controller comprising:

a. a Recently Acquired Lock Manager (RALM) for receiving explicit coherence commands from one of said processors, wherein each of said explicit coherence commands can be either an acquire command or a release command, said acquire command being a command to acquire a range of memory addresses in write or a read only mode, said release command being a command to release a range of memory addresses, and for generating lock commands in response to said explicit coherence commands, said RALM receiving responses to said lock commands and setting completion bits in a a completion bit vector indicating completion of a corresponding one of said explicit coherence commands; and b. a Global Lock Manager (GLM) in each node of said system for receiving said lock commands from said RALM and for generating said responses granting or denying said lock commands from said RALM, wherein each of said lock commands indicates either a write or a read only mode, wherein said RALM and GLM prevent multiprocessors from simultaneously modifying said objects by granting said lock commands in a write mode to only a single processor at a time, wherein each GLM maintains locks for a corresponding assigned range of addresses, wherein said command to acquire a range of memory addresses is submitted by one of said processors, where said one processor is permitted to continue execution of other commands after submission of said acquire command and without waiting for completion of said acquire command, and wherein said one processor checks for the setting of a corresponding bit in said completion bit vector before it accesses said range specified in said acquire command.

5. A coherence object controller for operation with a multiprocessor system for interleaving accesses to a plurality of objects while preventing corruption of said objects, said coherence object controller comprising:

a. means for executing explicit coherence commands received from processors of said multiprocessor system, wherein each of said explicit coherent commands can be either an acquire or a release command, said acquire command being a command to acquire a range of memory addresses in a write or read only mode, said release command being a command to release a range of memory addresses;

b. means for indicating completion of execution of said explicit coherence commands wherein said means for indicating completion of said explicit coherence commands is a completion bit vector maintained in a register in each of said processors;

c. means for holding any first range of addresses by any one of said processors in a write or read only mode upon indication of completion of one of said explicit coherence commands from said one processor, said mode being a write mode if said one explicit coherence command is an acquire write command, and said mode being a read only mode if said one explicit coherence command is an acquire read only command; and d. means for dropping any second range of addresses by any one of said processors upon indication of completion by latter said one processor of an explicit coherence command, of said explicit coherence commands, if latter said explicit command is a release command;

wherein said command to acquire a range of memory addresses is submitted by one of said processors, wherein said one processor is permitted to continue execution of other commands after submission of said acquire command and without waiting for completion of said acquire command, and wherein said one processor checks for the setting of a corresponding bit in said completion bit vector before it accesses said range specified in said acquire command.

* * * * *